US009124402B2

(12) United States Patent
Nabar et al.

(10) Patent No.: US 9,124,402 B2
(45) Date of Patent: Sep. 1, 2015

(54) METHOD AND APPARATUS FOR TRANSMITTING FIRST DATA STREAMS VIA RESPECTIVE TRANSMITTERS TO MULTIPLE CLIENTS STATIONS DURING A SAME PERIOD AND SUCCESSIVELY TRANSMITTING SECOND DATA STREAMS

(71) Applicant: Marvell World Trade Ltd., St. Michael (BB)

(72) Inventors: Rohit U. Nabar, Sunnyvale, CA (US); Hongyuan Zhang, Fremont, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/080,087

(22) Filed: Nov. 14, 2013

(65) Prior Publication Data
US 2014/0071973 A1 Mar. 13, 2014

Related U.S. Application Data

(63) Continuation of application No. 13/430,170, filed on Mar. 26, 2012, now Pat. No. 8,588,144, which is a continuation of application No. 12/175,526, filed on Jul. 18, 2008, now Pat. No. 8,144,647.

(60) Provisional application No. 60/950,429, filed on Jul. 18, 2007, provisional application No. 61/057,609, filed on May 30, 2008.

(51) Int. Cl.
*H04W 4/00* (2009.01)
*H04L 5/00* (2006.01)
(Continued)

(52) U.S. Cl.
CPC .............. *H04L 5/006* (2013.01); *H04B 7/0452* (2013.01); *H04B 7/0697* (2013.01); *H04L 65/608* (2013.01); *H04W 72/048* (2013.01); *H04W 28/0215* (2013.01); *H04W 74/06* (2013.01)

(58) Field of Classification Search
None
See application file for complete search history.

(56) References Cited

U.S. PATENT DOCUMENTS 5,539,394 A 7/1996 Cato et al.
6,127,971 A 10/2000 Calderbank et al.
(Continued)

FOREIGN PATENT DOCUMENTS

EP 1087630 A1 3/2001
EP 1286491 A1 2/2003
(Continued)

OTHER PUBLICATIONS

U.S. Appl. No. 12/730,651, filed Mar. 24, 2010, Zhang et al.
(Continued)

*Primary Examiner* — Bob Phunkulh

(57) ABSTRACT

An access point including a first transmitter and a second transmitter. The first transmitter is configured to (i) during a first window, transmit a first data stream to a first client station, and (ii) during a second window, transmit a second data stream to a second client station. The second transmitter is configured to: during the first window and while the first transmitter transmits the first data stream to the first client station, transmit a third data stream to a third client station; during a first portion of the second window and while the first transmitter is transmitting the second data stream to the second client station, refrain from transmitting a fourth data stream to a fourth client station; and subsequent to the first transmitter completing the transmission of the second data stream and during a second portion of the second window, transmit the fourth data stream to the fourth client station.

18 Claims, 10 Drawing Sheets

(51) Int. Cl.
*H04W 72/04* (2009.01)
*H04B 7/04* (2006.01)
*H04B 7/06* (2006.01)
*H04L 29/06* (2006.01)
*H04W 74/06* (2009.01)
*H04W 28/02* (2009.01)

(56) References Cited

U.S. PATENT DOCUMENTS

| | | |
|---|---|---|
| 6,272,117 B1 | 8/2001 | Choi et al. |
| 6,594,251 B1 | 7/2003 | Raissinia et al. |
| 7,289,481 B2 | 10/2007 | Wax et al. |
| 7,339,949 B2 | 3/2008 | Suzuki et al. |
| 7,372,830 B2 | 5/2008 | Jung et al. |
| 7,394,787 B2 | 7/2008 | Lee |
| 7,411,898 B2 | 8/2008 | Erlich et al. |
| 7,436,903 B2 | 10/2008 | Sandhu et al. |
| 7,493,134 B2 | 2/2009 | Shinozaki |
| 7,532,681 B2 | 5/2009 | Takeda et al. |
| 7,636,328 B2 | 12/2009 | Teague et al. |
| 7,855,993 B2 | 12/2010 | Mujtaba |
| 7,873,049 B2 | 1/2011 | Gaur et al. |
| 8,126,090 B1 | 2/2012 | Nabar |
| 8,144,647 B2 | 3/2012 | Nabar et al. |
| 8,149,811 B2 | 4/2012 | Nabar et al. |
| 8,320,301 B2 | 11/2012 | Walton et al. |
| 8,331,419 B2 | 12/2012 | Zhang et al. |
| 8,437,440 B1 | 5/2013 | Zhang et al. |
| 8,462,643 B2 | 6/2013 | Walton et al. |
| 8,462,863 B1 | 6/2013 | Zhang et al. |
| 8,498,362 B2 | 7/2013 | Zhang et al. |
| 8,527,853 B2 | 9/2013 | Lakkis |
| 8,542,589 B2 | 9/2013 | Surineni et al. |
| 8,559,803 B2 | 10/2013 | Huang et al. |
| 8,588,144 B2 | 11/2013 | Nabar et al. |
| 8,599,803 B1 | 12/2013 | Zhang et al. |
| 8,867,653 B2 | 10/2014 | Zhang et al. |
| 2001/0038619 A1 | 11/2001 | Baker et al. |
| 2002/0150058 A1 | 10/2002 | Kim et al. |
| 2002/0174172 A1 | 11/2002 | Hatalkar |
| 2004/0136465 A1 | 7/2004 | Hwang et al. |
| 2004/0146018 A1 | 7/2004 | Walton et al. |
| 2004/0203472 A1 | 10/2004 | Chien |
| 2004/0208253 A1 | 10/2004 | Joo |
| 2005/0013239 A1 | 1/2005 | Agrawal et al. |
| 2005/0015703 A1 | 1/2005 | Terry et al. |
| 2005/0068900 A1 | 3/2005 | Stephens et al. |
| 2005/0111451 A1 | 5/2005 | Kim |
| 2005/0136933 A1 | 6/2005 | Sandhu et al. |
| 2005/0195786 A1 | 9/2005 | Shpak |
| 2005/0195858 A1 | 9/2005 | Nishibayashi et al. |
| 2005/0233709 A1 | 10/2005 | Gardner et al. |
| 2005/0281243 A1 | 12/2005 | Horn et al. |
| 2006/0007898 A1 | 1/2006 | Maltsev et al. |
| 2006/0009189 A1 | 1/2006 | Kim et al. |
| 2006/0045048 A1 | 3/2006 | Kwon et al. |
| 2006/0114865 A1 | 6/2006 | Hashimoto et al. |
| 2006/0114878 A1 | 6/2006 | Choe et al. |
| 2006/0120341 A1 | 6/2006 | Del Prado Pavon et al. |
| 2006/0176968 A1 | 8/2006 | Keaney et al. |
| 2006/0250938 A1 | 11/2006 | Khan et al. |
| 2007/0047666 A1 | 3/2007 | Trachewsky |
| 2007/0049208 A1 | 3/2007 | Kim et al. |
| 2007/0070927 A1 | 3/2007 | Shoki et al. |
| 2007/0081602 A1 | 4/2007 | Tanaka et al. |
| 2007/0086400 A1 | 4/2007 | Shida et al. |
| 2007/0153725 A1 | 7/2007 | Waxman |
| 2007/0211823 A1 | 9/2007 | Mazzarese et al. |
| 2007/0230338 A1 | 10/2007 | Shao et al. |
| 2008/0049654 A1 | 2/2008 | Otal et al. |
| 2008/0118011 A1 | 5/2008 | Trachewsky et al. |
| 2008/0205317 A1 | 8/2008 | Piipponen et al. |
| 2008/0227475 A1 | 9/2008 | Suemitsu et al. |
| 2008/0253328 A1 | 10/2008 | Sahinoglu et al. |
| 2008/0298435 A1 | 12/2008 | Lakkis |
| 2008/0299962 A1 | 12/2008 | Kasher |
| 2009/0022093 A1 | 1/2009 | Nabar et al. |
| 2009/0022128 A1 | 1/2009 | Nabar et al. |
| 2009/0060094 A1 | 3/2009 | Jung et al. |
| 2009/0190547 A1 | 7/2009 | Shi et al. |
| 2009/0196163 A1 | 8/2009 | Du |
| 2009/0257476 A1 | 10/2009 | Watanabe |
| 2009/0285319 A1 | 11/2009 | Zhang et al. |
| 2010/0046358 A1 | 2/2010 | van Nee |
| 2010/0046656 A1 | 2/2010 | van Nee et al. |
| 2010/0074362 A1 | 3/2010 | Lim et al. |
| 2010/0098146 A1 | 4/2010 | Kim et al. |
| 2010/0158164 A1 | 6/2010 | Oh et al. |
| 2010/0166087 A1 | 7/2010 | Lomnitz |
| 2010/0246543 A1 | 9/2010 | Rajkotia et al. |
| 2010/0309958 A1 | 12/2010 | Lakkis |
| 2011/0002280 A1 | 1/2011 | Davydov et al. |
| 2011/0002430 A1 | 1/2011 | Kim et al. |
| 2011/0051705 A1 | 3/2011 | Jones, IV et al. |
| 2011/0096796 A1 | 4/2011 | Zhang et al. |
| 2011/0134899 A1 | 6/2011 | Jones, IV et al. |
| 2011/0142020 A1 | 6/2011 | Kang et al. |
| 2011/0299382 A1 | 12/2011 | Van Nee et al. |
| 2011/0305178 A1 | 12/2011 | Zheng et al. |
| 2011/0305296 A1 | 12/2011 | Van Nee |
| 2012/0039406 A1 | 2/2012 | Srinivasa et al. |
| 2012/0195391 A1 | 8/2012 | Zhang et al. |
| 2012/0224570 A1 | 9/2012 | Seok et al. |
| 2012/0294294 A1 | 11/2012 | Zhang |
| 2012/0300874 A1 | 11/2012 | Zhang |
| 2012/0320889 A1 | 12/2012 | Zhang et al. |
| 2013/0016642 A1 | 1/2013 | Banerjea et al. |
| 2013/0016737 A1 | 1/2013 | Banerjea |
| 2013/0051260 A1 | 2/2013 | Liu |
| 2013/0177096 A1 | 7/2013 | Park et al. |
| 2013/0235908 A1 | 9/2013 | Zhang et al. |
| 2013/0243115 A1 | 9/2013 | Taghavi Nasrabadi et al. |
| 2013/0287043 A1 | 10/2013 | Nanda et al. |

FOREIGN PATENT DOCUMENTS

| | | |
|---|---|---|
| EP | 1 357 693 | 10/2003 |
| EP | 1545025 A1 | 6/2005 |
| EP | 1 598 975 | 11/2005 |
| EP | 1679803 A2 | 7/2006 |
| JP | 62-176235 | 8/1987 |
| JP | 62176235 | 1/1989 |
| JP | 06268575 | 9/1994 |
| JP | 2003179581 A | 6/2003 |
| JP | 2005/102136 | 4/2005 |
| JP | 2005509360 A | 4/2005 |
| JP | 2005514859 A | 5/2005 |
| JP | 2006504335 A | 2/2006 |
| JP | 2006197586 A | 7/2006 |
| JP | 2007096744 A | 4/2007 |
| JP | 2007110456 A | 4/2007 |
| JP | 2007124376 A | 5/2007 |
| WO | WO-03005652 A1 | 1/2003 |
| WO | WO 03/041300 | 5/2003 |
| WO | WO/03/058881 | 7/2003 |
| WO | WO-2004084436 A1 | 9/2004 |
| WO | WO-2005067212 A1 | 7/2005 |
| WO | WO/2005/079012 | 8/2005 |
| WO | WO-2006020520 A2 | 2/2006 |
| WO | WO/2006/054252 | 5/2006 |
| WO | WO-2006048037 A1 | 5/2006 |
| WO | WO-2006051771 A1 | 5/2006 |
| WO | WO-2006132506 A1 | 12/2006 |
| WO | WO-2007043108 A1 | 4/2007 |
| WO | WO-2007052150 A1 | 5/2007 |
| WO | WO-2007073040 A1 | 6/2007 |
| WO | WO-2009012448 A2 | 1/2009 |
| WO | WO-2009059229 A1 | 5/2009 |
| WO | WO-2009114612 A1 | 9/2009 |

(56) References Cited

FOREIGN PATENT DOCUMENTS

WO    WO-2010095793 A1    8/2010
WO    WO-2012122119 A1    9/2012

OTHER PUBLICATIONS

"IEEE P802.11n™ /D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancement for Higher Throughput," The Institute of Electrical and Electronics Engineers, Inc., Sep. 2007; 544 pages.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancement for Higher Throughput," The Institute of Electrical and Electronics Engineers, Inc., Oct. 29, 2009; 535 pages.

The International Search Report and Written Opinion of the International Searching Authority for corresponding International Application No. PCT/US2011/043134, mailed Nov. 2, 2011, 10 Pages.

De Vegt, Rolf, IEEE 802.11-11/0457r0, Potential Compromise for 802.11ah Use Case Document, Mar. 17, 2011, 27 pages.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

Haene et al., "A Real-Tim 4-Stream MIMO-OFDM Transceiver: System Design, FPGA Implementation, and Characterization," IEEE Journal on Selected Areas in Communications, vol. 26, No. 6 ( Aug. 2008); 13 pages.

Huaning Niu et al., "Advanced Wireless Communication Systems and Techniques", Jul. 6, 2009, Provisional U.S. Appl. No. 61/223,360, 93 pages.

IEEE 802.11-11/042Irl, D1.0 PHY Comments Discussion, Mar. 15, 2011, 14 pages.

IEEE 802.11-11/1483rL, 11ah Preamble for 2MHz and Beyond, Nov. 7, 2011, 17 pages.

IEEE 802.16; IEEE Standard for Local and Metropolitan Area Networks; Part 16: Air Interface for Broadband Wireless Access Systems: IEEE Computer Society and the IEEE Microwave Theory and Techniques Society; 2009; 2082 Pages.

IEEE P802.11, Wireless LANs, Mar. 2012, 13 pages.

IEEE P802.11-09/0992r11—Specification Framework for Tgac, [Online] May 18, 2010, retrieved from the Internet: https://mentor.ieee.org/802.11/dcn/09/11-09-0992-11-00ac-proposed-specification-framework-for-tgac.doc, pp. 1-10.

IEEE P802.11ac/D0.2 Draft Standard for Information Technology Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz, Jan. 2012, 359 pages.

IEEE P802.11ac/D0.2 Draft Standard for Information Technology Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz, Mar. 2011, 184 pages.

IEEE P802.11nTM, IEEE Standard for Information Technology—Telecommunication and information exchange between systems—Local and metropolitan area networks—Specific requirements; Part 11: Wireless LAN Medium Access Control (MAC) and Physcial Layer (PHY) Specifications; Amendment 5 Enhancements for Higher Throughput; "The Institute of Electrical and Electronics Engineers, Inc." Oct. 2009.

IEEE P802.11nTM/D3.00, Draft Standard for Information Technology—Telecommunication and information exchange between systems—Local and metropolitan area networks—Specific requirements; Part 11: Wireless LAN Medium Access Control (MAC) and Physcial Layer (PHY) Specifications; Amendment 4 Enhancements for Higher Throughput; "The Institute of Electrical and Electronics Engineers, Inc." Sep. 2007.

IEEE Std 802.11-2007 (Revision of IEEE Std. 802.11-1999) Information Standard for Information Technology—Telecommunications and information exchange between systems—Local and metropolitan area networks—Specific requirements—Part 11: Wireless LAN Medium Access Control (MAC) and Phsycial Layer (PHY) specifications, "The Institution of Electrical and Electronics Engineers, Inc.," Jun. 12, 2007; 1232 Pages.

IEEE Std 802.11ac/D2.0 Draft Standard for Information Technology—Telecommunications and information exchange between systems—Local and metropolitan area networks—Specific requirements—Part 11: Wireless LAN Medium Access Control (MAC) and Phsycial Layer (PHY) specification: Amendment 4: Enhancements for Very High Throughput for Operation in Bands below 6 GHz, The Institution of Electrical and Electronics Engineers, Inc., Jan. 2012; 359 Pages.

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operations," The Institute of Electrical and Electronics Engineers, Inc., Nov. 2011; 123 Pages.

IEEE Std 802.11b-2001 (Corrigendum to IEEE Std 802.11b-1999) IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1, The Institute of Electrical and Electronics Engineers, Inc. Nov. 7, 2001; 23 pages.

IEEE Std 802.11g/D2.8, May 2002 (Supplement to ANSI/IEEE Std 802.11, 1999 Edition) Draft Supplement to Standard [for] Information Technology—Telecommunications and information exchange between systems—Local and metropolitan area networks—Specific requirements—Part 11: Wireless LAN Medium Access Control (MAC) and Phsycial Layer (PHY) specifications: Further Higher-Speed Physical Layer Extension in the 2.4 GHz Band, "The Institution of Electrical and Electronics Engineers, Inc.," May 2002; 53 Pages.

IEEE Std 802.11™-2012, IEEE Standard for Information technology—Telecommunications and information exchange between systemsLocal and metropolitan area networks—Specific requirements, Part 11: Wireless LAN Medium Access Control (MAC) and Physical Layer (PHY) Specifications, Mar. 29, 2012, 2793 pages.

IEEE Std 802.16TM-2001; IEEE Standard for Local and metropolitan area networks, Part 16: Air Interface for Fixed Broadband Wireless Access Systems; LAN/MAN Standards Committee, IEEE Computer Society and IEEE Microwave Theory and Techniques Society; Apr. 8, 2002; 349 Pages.

IEEE Std P802.11-REVma/06.0, "Unapproved Draft Standard for Information Technology—Telecommunications and information exchange between systems—Local and metropolitan area networks—Specific requirements—Part 11: Wireless LAN Medium Access Control (MAC) and Phsycial Layer (PHY) specification. (This document reflects the combining of the 2003 of the 2003 Edition of 802.11 plus the 802.11g, 802.11h 802.11i and 802.11j Amendments) (Revision of IEEE Std 802.11-1999)(Superseded by P802.11-REVma_D7.0)," 2006; 1212 Pages.

Imashioya et al., "RTL Design of 1.2 Gbps MIMO WLAN System and its Business Aspect," IEEE 9th Int'l Symposium on Communications and Information Technology (ISCIT 2009), The Institute of Electrical and Electronics Engineers 2009; pp. 296-301.

International Preliminary Report on Patentability in corresponding PCT/US2012/022768 dated Jul. 30, 2013.

International Search Report and Written Opinion for International Application No. PCT/US2012/022768, dated Jul. 5, 2012; 17 Pages.

(56) References Cited

OTHER PUBLICATIONS

International Search Report and Written Opinion of the International Searching Authority, dated Jul. 19, 2012; in reference to PCT/US/2012/036917, filed Aug. 5, 2012; 15 pages.
Invitation to Pay Additional Fees and Partial International Search Report for International Application No. PCT/US2012/022769, dated Apr. 26, 2012; 8 Pages.
Notification of Transmittal of the Inernational Search Report and the Written Opinion of the International Searching Authority dated Oct. 17, 2012; International Application No. PCT/US2012/046929, International Filing Date Jul. 16, 2012; 4 Pages.
Notification of Transmittal of the International Search Report and the Written Opinion of the International Searching Authority dated Oct. 17, 2012; International Application No. PCT/US2012/046929, International Filing Date Jul. 16, 2012; 7 pages.
Notification of Transmittal of the International Search Report and the Written Opinion of the International Searching Authority for PCT/US2012/046908, International Filing Date Jul. 16, 2012, 13 pages.
Perahai, et al., "Gigabit Wireless LANs: an overview of IEEE 802.11ac and 802.11ad," ACM SIGMOBILE Mobile Computing and Communications Review, vo. 15, No. 3, Jul. 2011; pp. 23-33.
S. A. Mujaba, IEEE P802.11a-1999 (Supplement to IEEE Std 802.11-1999) Supplement to IEEE Standard for Information technology—Telecommunications and information exchange between systems—Local and metropolitan area netwoks—Specifc requirements—Part 11: Wireless LAN Medium Access Control (MAC) and Physical Layer (PHY) Specifications; High-Speed Physical Layer in the 5 GHz Band, *"The Institute of Electrical and Electronics Engineer, Inc."* (1999).
S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005; 131 Pages.
Shi et al., "Phase Tracking During VHT-LTF," doc. No. IEEE 802.11-10/0771r0, The Institute of Electrical and Electronics Engineers, Jul. 2010; 19 Pages.
Stacey et al., "IEEE P802.11, Wireless LANs Propsed Tgac Draft Amendment," The Institution of Electrical and Electronics Engineers, Inc., doc. No. IEEE 802.11-10/1361r3; Jan. 2011; 154 Pages.
Stacey et al., "Specification Framework for Tgac," document No. IEEE 802.11-09-0992r20, The Institution of Electrical and Electronics Engineers, Inc., Jan. 18, 2011 pp. 1-49.
Syafei et al., "A Design of Next Generation Gigabit MIMO Wireless LAN System," IEEE 12th Int'l Conference on Advanced Communication Technology (ICACT 2010), The Institute of Electrical and Electronics Engineers 2010; pp. 941-946.
Syafei et al., "A Gigabit MIMO WLAN System with International Standardization Strategy," IEEE Int'l Symposium on Intelligent Signal Processing and Communication Systems (ISPACS 2009), The Institute of Electrical and Electronics Engineers, Dec. 7, 2009; pp. 228-31.
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), The Institute of Electrical and Electronics Engineers, 2009; pp. 207-11.
Taghavi et al., "Introductory Submission for Tgah", doc No. IEEE 802.11-11/0062r0, Institute for Electrical and Electronics Engineers, pp. 1-5 (Jan. 14, 2011); 6 Pages.
Van Nee et al., "The 802.11n MIMO-OFDM Standard for Wireless LAN and Beyond," Wireless Personal Communications, vol. 37 pp. 445-453 (2006).
Van Zelst et al., "Pilot Sequence for VHT-DATA," doc. No. IEEE 802.11-10/0811r1, The Institute of Electrical and Electronics Engineers, Jul. 2010; 10 Pages.
Vermani et al., "Spec Framework Text for Phy Numerology," The Institute of Electrical and Electronics Engineers, doc. No. IEEE 802.11-11/1311r0, Sep. 2011; 5 Pages.
Vermani, et al., "Preamble Format for 1 MHz," The Institute of Electrical and Electronics Engineers, doc. No. IEEE 802.11-11/1482r2, (Nov. 2011); 30 Pages.
Yu, et al., "Coverage extension for IEEE 802.11ah," The Institute of Electrical and Electronics Engineers, doc. No. IEEE 802.11-11/0035r1, (Nov. 2011); 10 Pages.
Zhang et al., "11ah Data Transmission Flow," The Institute of Electrical and Electronics Engineers, doc. No. IEEE 802.11-11/1484r1, (Nov. 2011); 15 Pages.
ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.
IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.
IEEE 802.11n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.
IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.
IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.
IEEE Std 802.16-2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.
IEEE Std 802.11h™-2003 [Amendment to IEEE Std 802.11™, 1999 Edition (Reaff 2003) as amended by IEEE Stds 802.11a™-1999, 802.11b™-1999, 802.11b™-1999/Cor 1-2001, 802.11d™-2001, 802.11g™-2003]; IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe; IEEE Computer Society; LAN/MAN Standards Committee; Oct. 14, 2003; 75 pages.
IEEE 802.20-PD-06; IEEE P 802.20™ V14; Jul. 16, 2004; Draft 802.20 Permanent Document; System Requirements for IEEE 802.20 Mobile Broadband Wireless Access Systems—Version 14; 24 pages.
Specification of the Bluetooth System—Specification vol. 0; Master Table of Contents & Compliance Requirements; Covered Core Package version: 2.0 +EDR; Current Master TOC issued: Nov. 4, 2004; Part A, pp. 1-74; vol. 1, pp. 1-92; vol. 2 & 3, pp. 1-814; vol. 4, pp. 1-250.
Notification of Transmittal of the International Search Report and the Written Opinion of the International Searching Authority, or the Declaration dated Dec. 23, 2008 in reference to PCT/US2008/070466.

(56) References Cited

OTHER PUBLICATIONS

Freescale Semiconductor Inc., Downlink reference signaling for MU-MIMO, 3GPP R1-071509, Mar. 17, 2007.
Alcatel-Lucent et al., Dedicated Reference Signals for MU-MIMO Precoding in E-UTRA Downlink, 3GPP R1-071069, Feb. 16, 2007.
Chang, Yuang; Wang, Junyi; Zhu Houtao; Kashima, Tsuyoshi; Araki, Kiyomichi:Integrated User Scheduling Algorithm for Multi-User MIMO-Downlink System, IEICE technical report, Jun. 21, 2007, vol. 107, No. 113, pp. 91-96. RCS2007-26.
Japanese Office Action Dated Apr. 17, 2013.
Japanese Office Action dated Nov. 28, 2013 for Japnese Application No. 2012-165994; 2 Pages.
First Office Action from Chinese Patent Office for Chinese Patent Application No. 200800250809; Translated; 7 Pages.
Notice of Reason for Rejection from Japanese Patent Office for Japanese Patent Application No. 2010-517185; Translation from RYUKA IP Law Firm; 3 Pages.
The International Search Report and the Written Opinion of the International Searching Authority, or the Declaration mailed Mar. 11, 2003 for International Application No. PCT/US2008/070469 filed Jul. 18, 2008; 15 Pages.
Second Office Action in corresponding European Patent Application No. 08 782 054.4 dated Feb. 3, 2011.
Invitation to Pay Additional Fees and, where Applicable, Protest Fee dated Jan. 21, 2009 in reference to PCT/US2008/070469; 25 Pages.
U.S. Appl. No. 13/159,143, filed Jun. 13, 2011, Srinivasa et al.
Srinivasa et al., U.S. Appl. No. 13/159,143, filed Jun. 13, 2011.
Park, "Proposed Specification Framework for Tgah", The Institute of Electrical and Electronics Engineers, doc. No. IEEE 802.11-11/1137r6, Mar. 2012.
Zhang et al., U.S. Appl. No. 12/730,651, filed Mar. 24, 2010.
IEEE Std. P802.11ad/D5.0 "Draft Standard for Information Technology—Telecommunications and information exchange between systems—Locl and metropolitan area networks—Specific requirements, Part 11: Wireless LAN Medium Access Control (MAC) and Physical Layer (PHY) specifications: Amendment 3: Enhancements for Very High Throughput in the 60 GHz Band," The Institute of Electrical and Electronics Engineers, Inc., Sep. 2011.
Harada, "Project: IEEE P802.15 Working Group for Wireless Personal Area Network (WPANs)," IEEE 802.15/07/0693-003c (May 2007).
Freescale Semiconductor Inc.; "Downlink reference signalling for MI-MIMO"; 3GPP R1071509; Mar., 2007; 5 pages.
Chang et al.; "Integrated User Scheduling Algorithm for Multi-user MIMO Downlink System"; vol. 107, No. 113, Jun. 21, 2007; pp. 91-96.
Alcatel-Lucent et al.; "Dedicated Reference Signals for MU-MIMO Precoding in E-UTRA Downlink"; 3GPP R1-071069; Feb. 12-16, 2007; 4 pages.
Ritt et al.; "Eigen-mode Close-Loop Transmission for E-UTRA MIMO"; 3GPP R1-060421; Feb. 17, 2006; 9 pages.
Japanese Office Action for related Japanese Application No. 2013-171165 dated Feb. 17, 2015; 2 pages.

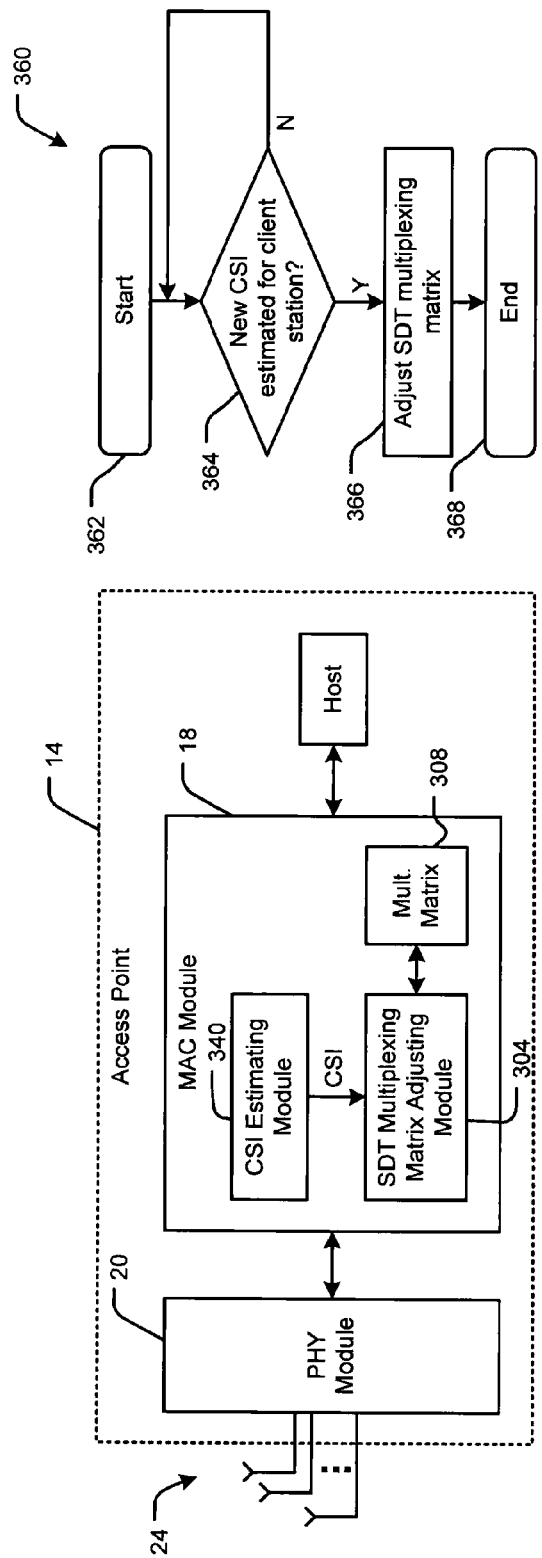

METHOD AND APPARATUS FOR TRANSMITTING FIRST DATA STREAMS VIA RESPECTIVE TRANSMITTERS TO MULTIPLE CLIENTS STATIONS DURING A SAME PERIOD AND SUCCESSIVELY TRANSMITTING SECOND DATA STREAMS

CROSS-REFERENCE TO RELATED APPLICATIONS

The present disclosure is a continuation of U.S. patent application Ser. No. 13/430,170 (now U.S. Pat. No. 8,588,144), filed Mar. 26, 2012, which is a continuation of U.S. patent application Ser. No. 12/175,526 (now U.S. Pat. No. 8,144,647), filed Jul. 18, 2008. This application claims the benefit of U.S. Provisional Application No. 60/950,429, filed on Jul. 18, 2007 and U.S. Provisional Application No. 61/057,609, filed on May 30, 2008. The entire disclosures of the applications referenced above are incorporated herein by reference.

FIELD

The present disclosure relates to wireless networks, and more particularly to wireless access points with simultaneous downlink transmission of independent data for multiple wireless client stations.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

When operating in an infrastructure mode, Wireless Local Area Networks (WLANs) typically include an access point (AP) and one or more client stations. WLANs have evolved rapidly over the past decade. Development of WLAN standards such as IEEE §§802.11a/b/en has focused primarily on improving single-user peak data throughput. For example, IEEE §802.11b operates at a single-user peak throughput of 11 Mbps, IEEE §802.11a/g operates at a single-user peak throughput of 54 Mbps, and IEEE §802.11n operates at a single-user peak throughput of 600 Mbps.

In these WLANs, the AP transmits information to one client station at a time in a unicast mode. Alternatively, the same information may be transmitted to a group of client stations concurrently in a multicast mode. This approach reduces network efficiency because other client stations need to wait until the current client station or group of client stations is serviced. When transmitting the same information to the group of client stations, throughput may be limited by one of the client stations with the weakest reception.

SUMMARY

An access point is provided and includes a first transmitter and a second transmitter. The first transmitter is configured to (i) during a first window, transmit a first data stream to a first client station, and (ii) during a second window, transmit a second data stream to a second client station. The second transmitter is configured to: during the first window and while the first transmitter transmits the first data stream to the first client station, transmit a third data stream to a third client station; during a first portion of the second window and while the first transmitter is transmitting the second data stream to the second client station, refrain from transmitting a fourth data stream to a fourth client station; and subsequent to the first transmitter completing the transmission of the second data stream and during a second portion of the second window, transmit the fourth data stream to the fourth client station.

In other features, a method is provided and includes: during a first window, transmitting, via a first transmitter, a first data stream from an access point to a first client station; during a second window, transmitting, via the first transmitter, a second data stream from the access point to a second client station; and during the first window and while the first transmitter transmits the first data stream to the first client station, transmitting, via a second transmitter, a third data stream from the access point to a third client station. The method further includes: during a first portion of the second window and while the first transmitter is transmitting the second data stream to the second client station, refraining from transmitting a fourth data stream from the second transmitter to a fourth client station; and subsequent to the first transmitter completing the transmission of the second data stream to the second client station and during a second portion of the second window, transmitting, via the second transmitter, the fourth data stream from the access point to the fourth client station.

A wireless network device is provided and includes modulation modules. Each of the modulation modules is configured to (i) receive a data stream, and (ii) modulate the data stream to generate a modulated data stream. A matrix module is configured to (i) generate a multiplexing matrix based on channel conditions between the wireless network device and each of a plurality of client stations, and (ii) apply the multiplexing matrix to each of the modulated data streams to generate multiplexed data streams. The wireless network device also includes summing modules. Each of the summing modules is configured to sum at least two of the multiplexed data streams to generate a transmit data stream. A first transmitter is configured to transmit a first one of the transmit data streams during a downlink transmission period to a first one of the client stations. A second transmitter is configured to transmit a second one of the transmit data streams to a second one of the client stations while the first transmitter transmits the first one of the transmit data streams.

In other features, the wireless network device simultaneously transmits the M transmit data streams to R client stations. The wireless network device transmits a first one of the M transmit data streams to at least two client stations and a second one of the M transmit data streams to at least one client station. M receivers respectively receive R acknowledgements (ACKs) from the R client stations during R allocated time slots of the SDT period. Each of the R modulation modules includes a spatial mapping module that performs spatial mapping of one of the R independent data streams and that generates M spatial data streams; M modulation mapping modules that receive respective ones of the M spatial data streams and that output a set of tones; a multiplexing matrix module that applies the multiplexing matrix to the M sets of tones; and an inverse Fast Fourier Transform module that communicates with an output of the multiplexing matrix module.

In other features, each of the M modulation mapping modules includes a quadrature amplitude modulation (QAM) module. A multiplexing matrix module generates a respective multiplexing matrix based on channel conditions between the wireless network device and each of the R client stations. The multiplexing matrix module determines a multiplexing matrix for one of the R client stations by minimizing signal energy of signals sent to others of the R client stations. The multiplexing matrix module determines a multiplexing matrix for one of the R client stations by maximizing a minimum signal-to-interference and noise ratio for the R client stations. The multiplexing matrix module determines the multiplexing matrix based on a signal-to-interference and noise ratio (SINR) of the R client stations.

In other features, the multiplexing matrix adjusts at least one of amplitude and phase for tones of the M transmit data streams. A transmitted signal vector s transmitted by the wireless network device is based on:

$$s = \sum_{i=1}^{N} W_i x_i$$

where $x_i$ is an information vector intended for an $i^{th}$ client station, $W_i$ is the multiplexing matrix for the $i^{th}$ client station.

In other features, a receiver receives channel state information (CSI) from the R client stations. Alternately, a channel condition estimator estimates channel state information based on signals received from the R client stations. The R independent data streams are arranged as subframes, frames, or packets.

A method includes receiving R independent data streams; modulating the R independent data streams; applying a multiplexing matrix to generate M modulated and multiplexed data streams, respectively, where R and M are integers greater than one; summing portions of each of the M modulated and multiplexed data streams to generate M transmit data streams; and simultaneously transmitting the M transmit data streams during a simultaneous downlink transmission (SDT) period.

In other features, the method includes transmitting the M transmit data streams to R client stations at the same time. The method includes transmitting a first one of the M transmit data streams to at least two client stations and a second one of the M transmit data streams to at least one client station. The method includes receiving R acknowledgements (ACKs) from the R client stations during R allocated time slots of the SDT period. The method includes performing spatial mapping of one of the R independent data streams and generating M spatial data streams; receiving respective ones of the M spatial data streams and outputting M sets of tones; applying the multiplexing matrix to the M sets of tones; and performing an inverse Fast Fourier Transform.

In other features, each of the M modulation mapping modules includes a quadrature amplitude modulation (QAM) module. The method includes generating a respective multiplexing matrix based on channel conditions between the wireless network device and each of the R client stations. The method includes determining a multiplexing matrix for one of the R client stations by minimizing signal energy of signals sent to others of the R client stations. The method includes determining a multiplexing matrix for one of the R client stations by maximizing a minimum signal-to-interference and noise ratio for the R client stations. The method includes determining the multiplexing matrix based on a signal-to-interference and noise ratio (SINR) of the R client stations. The method includes adjusting at least one of amplitude and phase for tones of the M transmit data streams. A transmitted signal vector s is based on:

$$s = \sum_{i=1}^{N} W_i x_i$$

where $x_i$ is an information vector intended for an $i^{th}$ client station, $W_i$ is the multiplexing matrix for the $i^{th}$ client station.

In other features, the method includes receiving channel state information (CSI) from the R client stations. The method includes estimating channel state information based on signals received from the R client stations. The R independent data streams are arranged as subframes, frames, or packets.

A wireless network device includes R modulation means for receiving R independent data streams, for modulating the R independent data streams, and for applying a multiplexing matrix to generate M modulated and multiplexed data streams, respectively, where R and M are integers greater than one. M summing means sum portions of each of the M modulated and multiplexed data streams to generate M transmit data streams. M transmitting means simultaneously transmit the M transmit data streams during a simultaneous downlink transmission (SDT) period.

In other features, the wireless network device simultaneously transmits the M transmit data streams to R client stations. The wireless network device transmits a first one of the M transmit data streams to at least two client stations and a second one of the M transmit data streams to at least one client station. M receiving means receive R acknowledgements (ACKs) from the R client stations during R allocated time slots, respectively, of the SDT period. Each of the R modulation means includes spatial mapping means for performing spatial mapping of one of the R independent data streams and for generating M spatial data streams; M modulation mapping means for receiving respective ones of the M spatial data streams and for outputting M sets of tones; multiplexing matrix means for applying the multiplexing matrix to the M sets of tones; and inverse Fast Fourier Transform means for communicating with an output of the multiplexing matrix means.

In other implementations, each of the M modulation mapping means performs quadrature amplitude modulation (QAM). Multiplexing matrix means generates a respective multiplexing matrix based on channel conditions between the wireless network device and each of the R client stations. The multiplexing matrix means determines a multiplexing matrix for one of the R client stations by minimizing signal energy of signals sent to others of the R client stations. The multiplexing matrix means determines a multiplexing matrix for one of the R client stations by maximizing a minimum signal-to-interference and noise ratio for the R client stations. The multiplexing matrix means determines the multiplexing matrix based on a signal-to-interference and noise ratio (SINR) of the R client stations. The multiplexing matrix adjusts at least one of amplitude and phase for tones of the M transmit data streams.

In other features, a transmitted signal vector s transmitted by the wireless network device is based on:

$$s = \sum_{i=1}^{N} W_i x_i$$

where $x_i$ is an information vector intended for an $i^{th}$ client station, $W_i$ is the multiplexing matrix for the $i^{th}$ client station.

In other features, receiving means receives channel state information (CSI) from the R client stations.

In other features, channel condition estimating means estimates channel state information based on signals received from the R client stations. The R independent data streams are arranged as subframes, frames, or packets.

A computer program stored on a computer readable medium and executed by a processor includes receiving R independent data streams; modulating the R independent data streams; applying a multiplexing matrix to generate M modulated and multiplexed data streams, respectively, where R and M are integers greater than one; summing portions of each of the M modulated and multiplexed data streams to generate M transmit data streams; and simultaneously transmitting the M transmit data streams during a simultaneous downlink transmission (SDT) period.

In other features, the computer program further includes transmitting the M transmit data streams to R client stations at the same time. The computer program includes transmitting a first one of the M transmit data streams to at least two client stations and a second one of the M transmit data streams to at least one client station. The computer program includes receiving R acknowledgements (ACKs) from the R client stations during R allocated time slots of the SDT period.

In other features, the computer program includes performing spatial mapping of one of the R independent data streams and generating M spatial data streams; receiving respective ones of the M spatial data streams and outputting M sets of tones; applying the multiplexing matrix to the M sets of tones; and performing an inverse Fast Fourier Transform.

In other features, each of the M modulation mapping modules includes a quadrature amplitude modulation (QAM) module. The computer program includes generating a respective multiplexing matrix based on channel conditions between the wireless network device and each of the R client stations. The computer program includes determining a multiplexing matrix for one of the R client stations by minimizing signal energy of signals sent to others of the R client stations. The computer program includes determining a multiplexing matrix for one of the R client stations by maximizing a minimum signal-to-interference and noise ratio for the R client stations. The computer program includes determining the multiplexing matrix based on a signal-to-interference and noise ratio (SINR) of the R client stations. The computer program includes adjusting at least one of amplitude and phase for tones of the M transmit data streams.

In other features, the computer program includes transmitting a transmitted signal vector s based on:

$$s = \sum_{i=1}^{N} W_i x_i$$

where $x_i$ is an information vector intended for an $i^{th}$ client station, $W_i$ is the multiplexing matrix for the $i^{th}$ client station.

In other features, the computer program includes receiving channel state information (CSI) from the R client stations. The computer program includes estimating channel state information based on signals received from the R client stations. The R independent data streams are arranged as subframes, frames, or packets.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 7A illustrates an exemplary AP;

FIG. 7B illustrates a method performed by the AP of FIG. 7A;

DESCRIPTION

Figure 1:
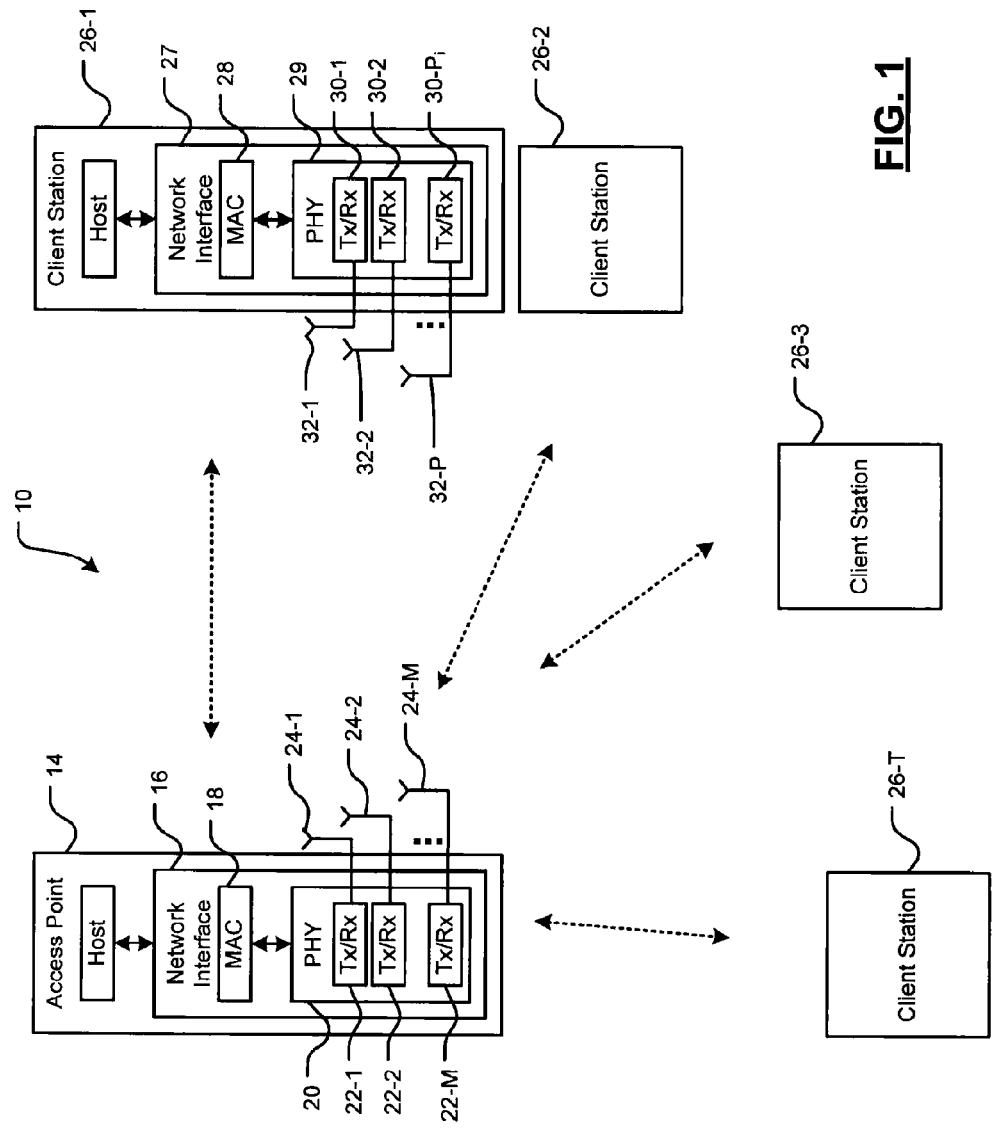
FIG. 1 is a functional black diagram of a WLAN including an access point (AP) and one or more client stations.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory (shared, dedicated, or group) that execute one or more software or firmware programs, a combinational logic circuit, and/or other suitable components that provide the described functionality.

A wireless network device such as an access point (AP) according to the present disclosure transmits independent data streams to multiple client stations simultaneously (hereinafter simultaneous downlink transmission (SDT)). Using this approach increases the number of client stations that can be serviced by a single AP during a given time interval. In addition, in one aspect, the present disclosure takes advantage of differing channel conditions of client stations associated with the AP to improve throughput.

Referring now to FIG. 1, a wireless local area network (WLAN) 10 includes an access point (AP) 14. The AP 14 includes a network interface 16 including a medium access control (MAC) module 18, a physical layer (PHY) module 20, M transceivers 22-1, 22-2, ..., 22-M, and M antennas 24-1, 24-2, ..., 24-M (collectively antennas 24), where M is an integer greater than one.

The WLAN 10 is associated with T client stations 26-1, 26-2, ..., 26-T (collectively client stations 26), where T is an integer greater than one. R of the T client stations are SDT enabled, and (T-R) of the T client stations 26 may be legacy client stations that are not SDT enabled, where R is an integer less than or equal to T. Each of the client stations 26 may include a network interface 27 including a MAC module 28, a PHY module 29, $P_i$ transceivers 30-1, 30-2, ..., 30-$P_i$, and $P_i$ antennas 32-1, 32-2, ..., 32-$P_i$, where $P_i$ is an integer greater than zero, and i corresponds to an $i^{th}$ one of the T client stations 26. The client stations 26 may have different numbers of transceivers and antennas.

The AP 14 simultaneously transmits independent data to two or more of the R client stations 26 that are SDT enabled during an SDT window. For example, during a given SDT window, the AP 14 can transmit first data to a first SDT enabled client station while simultaneously transmitting second data to a second SDT enabled client data station. The SDT window includes a SDT portion and an acknowledgement portion following the SDT portion. For example only, the independent data may be arranged as packets, frames or sub-frames. In addition, the AP 14 may also transmit and receive data to/from the (T-R) legacy client stations 26 in a conventional manner (e.g., using a non-overlapping transmission approach) during a legacy window, such as a carrier sense multiple access (CSMA) window. Multi-user throughput is the sum of single-user throughputs of simultaneously serviced client stations 26. Multi-user throughput is based on the number of users that can be reliably serviced simultaneously. Increasing the number of transmit antennas tends to improve the ability of the AP 14 to simultaneously service more client stations 26.

The AP 14 and the client stations 26 may communicate using orthogonal frequency division multiplexing (OFDM) processing. A multiplexing matrix W for each of the client stations 26 may be determined based on channel conditions between the AP 14 and the client station 26 for each OFDM tone. For example, channel knowledge may be obtained at the AP 14 using explicit simultaneous downlink transmission (SDT) and/or implicit SDT. For explicit SDT, the client station 26 feeds back channel state information (CSI) to the AP 14. For implicit SDT, the AP 14 infers the CSI or channel conditions from signals received from the client station 26 on a reverse link. The implicit SDT approach may incorporate an initial calibration exchange so that the AP 14 can calculate an appropriate correction matrix to infer forward channel conditions from the reverse channel conditions. The client stations 26 may be simultaneously serviced using the above techniques. The multiplexing matrix W for a client station 26 may be refreshed periodically—e.g., when certain events occur and/or when client channel conditions change.

A signal (or vector) to be transmitted to each client station 26 may be multiplied by a corresponding multiplexing matrix W. The multiplexing matrix W for each client station 26 will generally be different from that for other client stations 26. The multiplexing matrix W will typically be a function of the channel conditions between the AP 14 and the respective ones of the client stations 26. Steered signal vectors corresponding to the different client stations 26 are combined (e.g., added) and simultaneously transmitted by the AP 14 during an SDT window. The client stations 26 that receive the SDT data send an acknowledgement (ACK) during an allocated time slot during a later portion of the SDT window as will be described further below.

Each client station 26 receives signals intended for the client station 26 and signals intended for other client stations 26 as transformed by the channel. The multiplexing matrix W may be constructed based on interference avoidance and/or signal-to-interference and noise ratio (SINR) balancing. Interference avoidance attempts to minimize the amount of non-desired signal energy arriving at a client station 26. In the best case, interference avoidance ensures that signals intended for a particular client station 26 arrive only at the desired client station(s).

In addition to interference avoidance, signal-to-interference and noise ratio (SINR) balancing may be performed by the AP 14. SINR balancing involves designing multiplexing matrices to actively control the SINRs observed at the serviced client stations 26. For example, one SINR balancing approach may include maximizing the minimum SINR across serviced client stations 26.

A transmission signal model for a single tone for OFDM according to one implementation is set forth below:

$$s = \sum_{i=1}^{N} W_i x_i$$

where s is a transmitted signal vector for one tone, N is a number of simultaneously serviced users, $x_i$ is an information vector ($T_i \times 1$, $T_i < P_i$) intended for the $i^{th}$ user, $W_i$ is a multiplexing matrix ($M \times T_i$) for the $i^{th}$ user, M is a number of transmit antennas of the AP 14, and $P_i$ is the number of receive antennas of the $i^{th}$ client station 26. The transmission signal model extends to other OFDM tones. In addition, other modulation schemes and/or variants of OFDM may be used such as orthogonal OFDM multiple access (OFDMA).

For example only, the AP 14 determines the multiplexing matrix W for each of the client stations 26 based on channel conditions between the AP 14 and the respective client stations 26. The channel conditions for each of k tones of an OFDM signal may be as shown in Table I:

TABLE I

| | Tones | | | | |
|---|---|---|---|---|---|
| Client Station 1 | $H_1^1$ | $H_2^1$ | $H_3^1$ | ... | $H_k^1$ |
| Client Station 2 | $H_1^2$ | $H_2^2$ | $H_3^2$ | ... | $H_k^2$ |
| ... | ... | ... | ... | ... | ... |
| Client Station | $H_1^S$ | $H_2^S$ | $H_3^S$ | ... | $H_k^S$ |

$H_1^1$ represents the channel for a first tone of a first client station 26, $H_2^1$ represents the channel for second tone of the first client station 26, etc. The first tone received by the first client station 26 will be $H_1^1[W_1^1 s_1 + W_1^2 s_2 + \ldots + W_1^N s_s]$. The multiplexing matrix W may be selected to allow the first client station 26 to receive $W_1^1 W_1^1 s_1$ and to have the remaining signals $s_2, s_3, \ldots, s_s$ be in a null space for the first client station 26. Therefore when using the signal interference approach, the values of the multiplexing matrix W are selected such that $H_1^1 W_1^2 \approx 0, \ldots, H_1^1 W_1^N \approx 0$. In other words, the multiplexing matrix W adjusts phases and amplitudes for these OFDM tones such that a null is created at the first client station 26.

That way, the first client station 26 can receive the intended signal $s_1$ without interference from other signals $s_2, s_3, \ldots, s_s$ intended for the other client stations 26.

Power available to the AP 14 is typically constrained. When servicing multiple client stations 26 simultaneously, power available at the AP 14 may be allocated across multiple client stations 26. This, in turn, affects the SINR observed at each of the client stations 26. SDT tends to work best with flexible power management across the client stations 26. For instance, a client station 26 with low data rate requirements may be allocated less power by the AP 14. For instance, power may only be allocated to client stations 26 that have high probability of reliable reception (so as not to waste transmit power). Power may be adjusted in the corresponding multiplexing matrix W and/or after using other amplitude adjustment methods.

Independent data may also be simultaneously multicast to groups (independent across groups) of client stations 26. SDT may also be combined with the concept of data aggregation. Frames transmitted from the AP 14 may be divided into subframes. Conventionally, each subframe is addressed to a single client station 26 or a group of client stations 26. With SDT each sub-frame may carry independent information to client stations 26 or groups of client stations 26.

Figures 2, 3:
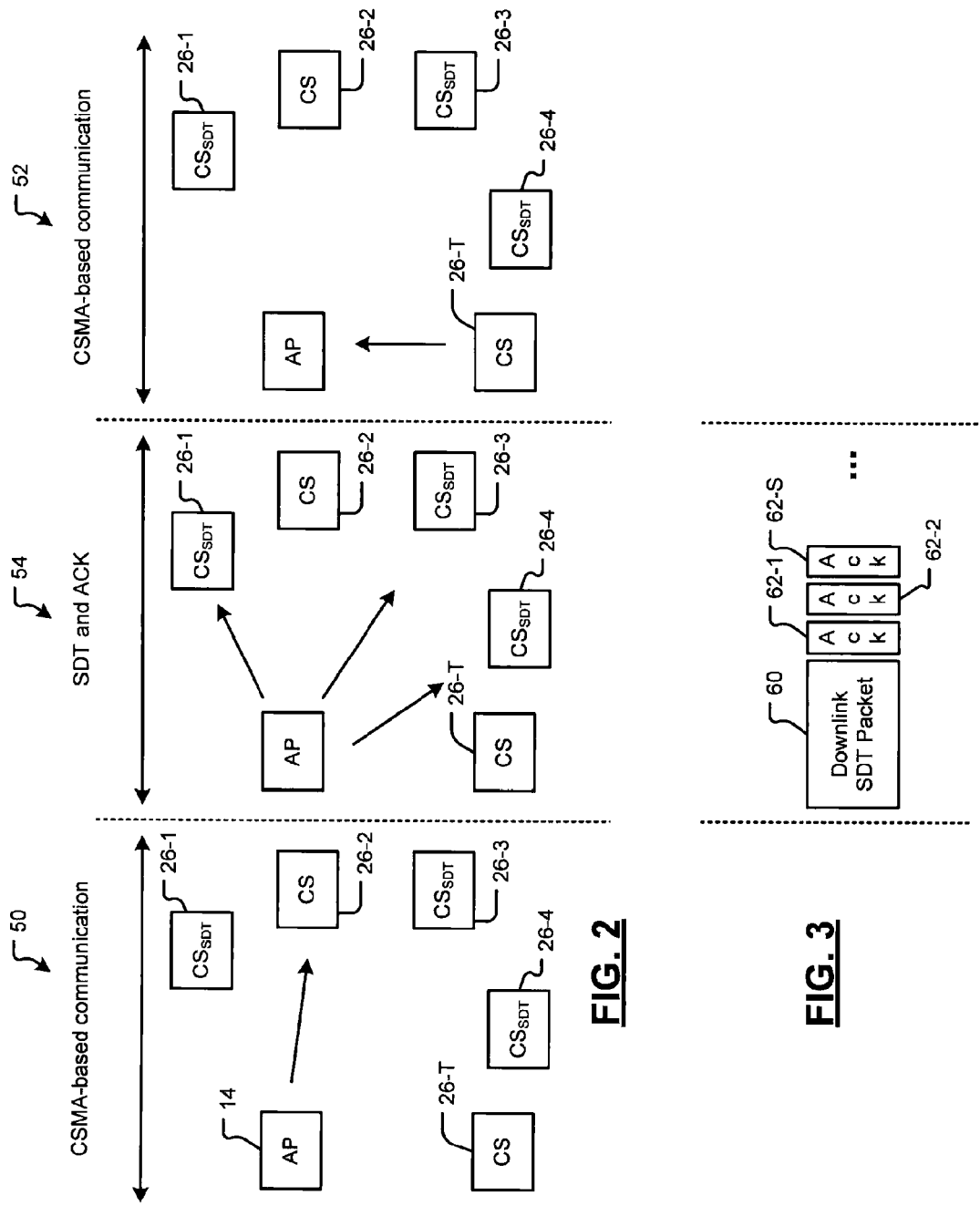
FIG. 2 is a timing diagram illustrating legacy windows and a simultaneous down link transmission (SDT) window.
FIG. 3 is a timing diagram illustrating a downlink STD packet and acknowledgments.

Referring now to FIGS. 2 and 3, exemplary legacy windows and SDT windows used by the AP 14 are shown. The AP 14 may transmit or receive data to/from legacy client stations 26 during legacy windows 50, 52. For example, the legacy windows 50, 52 may be CSMA windows. During an SDT window 54, the AP 14 sends SDT data 60 to multiple client stations 26 and then receives acknowledgements from the client stations 26. During the SDT window 54, other network devices are unable to transmit data. Time sufficient for the SDT window 54 may be arranged with the legacy client stations using MAC mechanisms provided by existing WLAN specifications.

In FIG. 3, the downlink SDT data 60 may be followed by a period of acknowledgments (ACKs) 62-1, 62-2, ... 62-X (collectively ACKs 62) from SDT-enabled client stations 26 that received data during the SDT window 54. The ACKs 62 may be transmitted after the SDT data based on a fixed schedule (e.g., using a time slot based approach). Allocation of the time slots may be performed by the AP 14. For example, timing data based on the allocation of the time slots may be sent to the client stations 26 in the SDT downlink frame. However, the allocation of time for ACKs may be distributed using other approaches and/or at other times.

Figure 4A:
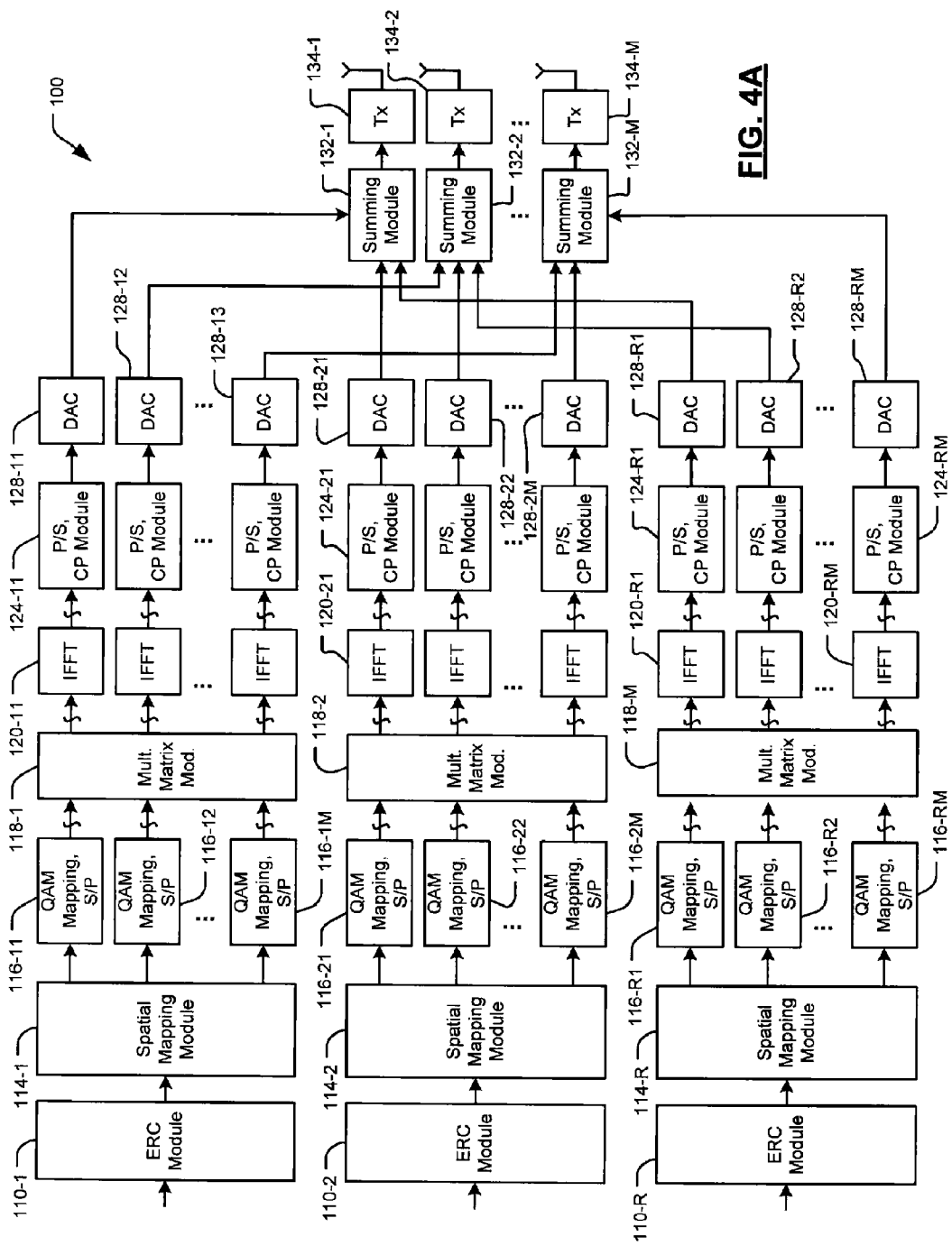
FIG. 4A is a functional block diagram of a transmit path of an AP.
Figure 4B:
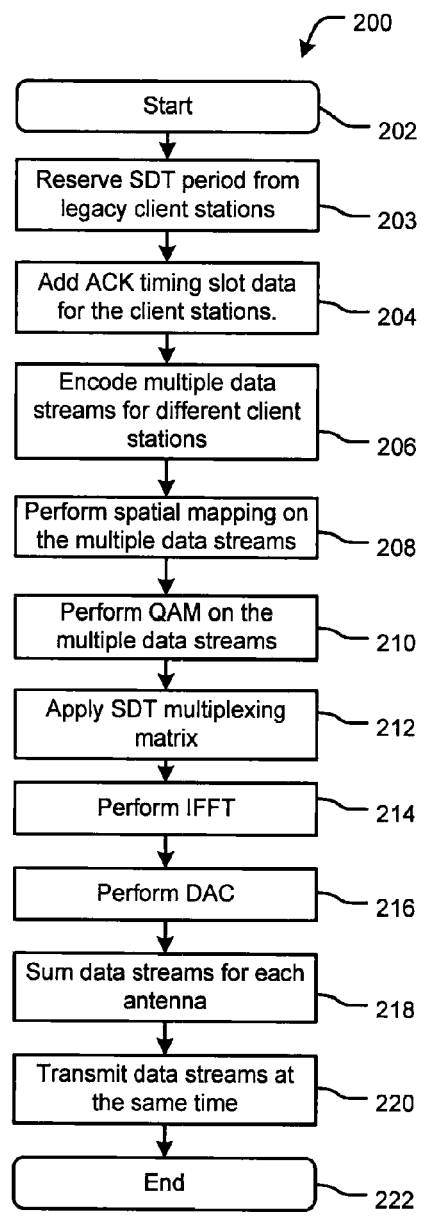
FIG. 4B illustrates a method performed by the transmit path of an AP.

Referring now to FIGS. 4A and 4B, a transmit path 100 of the AP 14 is shown. The transmit path 100 includes encoder modules 110-1, 110-2, ..., 110-R (collectively encoder modules 110) that receive R independent bit streams intended for R client stations 26. The encoder modules 110 output encoded bit streams to spatial mapping modules 114-1, 114-2, ..., 114-R (collectively spatial mapping modules 114), which perform spatial mapping.

Outputs of the spatial mapping modules 114 are input to quadrature amplitude modulation (QAM) mapping modules 116-11, 116-12, ..., 116-RM (collectively QAM mapping modules 116), which perform QAM and serial-to-parallel (S/P) conversion. The QAM mapping modules 116 output OFDM tones that are input to multiplexing matrix modules 118-1, 118-2, ..., 118-R (collectively multiplexing matrix modules 118). The multiplexing matrix modules 118 multiply the OFDM tones by a multiplexing matrix W as described herein.

Outputs of the multiplexing matrix modules 118 are input to inverse Fast Fourier Transform (IFFT) modules 120-11, 120-12, ..., 120-RM (collectively IFFT modules 120). Outputs of the IFFT modules 120 are input to a parallel-to-serial (P/S) converter and cyclic prefix modules 124-11, 124-12, ..., 124-RM (collectively P/S and CP modules 124). Outputs of the P/S and CP modules 124 are input to digital-to-analog converters (DACs) 128-11, 128-12, ..., 128-RM (collectively DACs 128). Summing modules 132-1, 132-2, ..., 132-M sum corresponding outputs of the DACs 128 for each of the data streams and output the sum to transmitters 134-1, 134-2, ..., 134-M and associated antennas.

In FIG. 4B, a method 200 performed by the transmit path 100 of the AP 14 is shown. The method begins with step 202 and proceeds to step 203. In step 203, the AP 14 may reserve a clear channel by instructing legacy client stations to refrain from transmitting during an SDT period. In step 204, the AP 14 may add ACK timing slot data for the SDT-enabled client stations.

In step 206, the transmit path 100 encodes multiple independent data dreams for different client stations. In step 208, spatial mapping is performed on the multiple data streams. In step 210, quadrature amplitude modulation is performed on the multiple data streams. In step 212, the SDT multiplexing matrix W is applied to the multiple data streams. In step 214, an inverse Fast Fourier Transform (IFFT) is performed on the multiple data streams. In step 216, the multiple data streams are converted from digital to analog format. The multiple data streams are summed in step 218 and transmitted at the same time in step 220. The method ends with step 222.

Figure 5B:
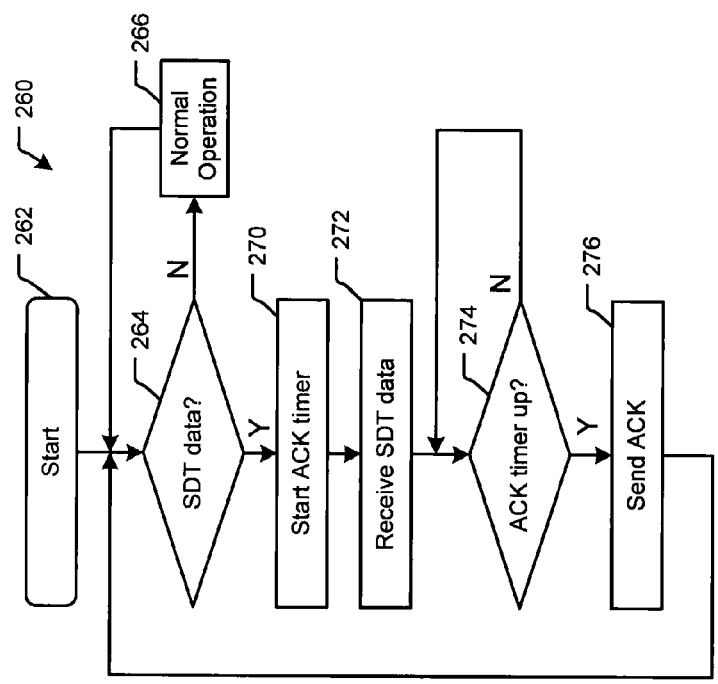
FIG. 5B illustrates a method performed by the SDT client station of FIG. 5A.
Figure 5A:
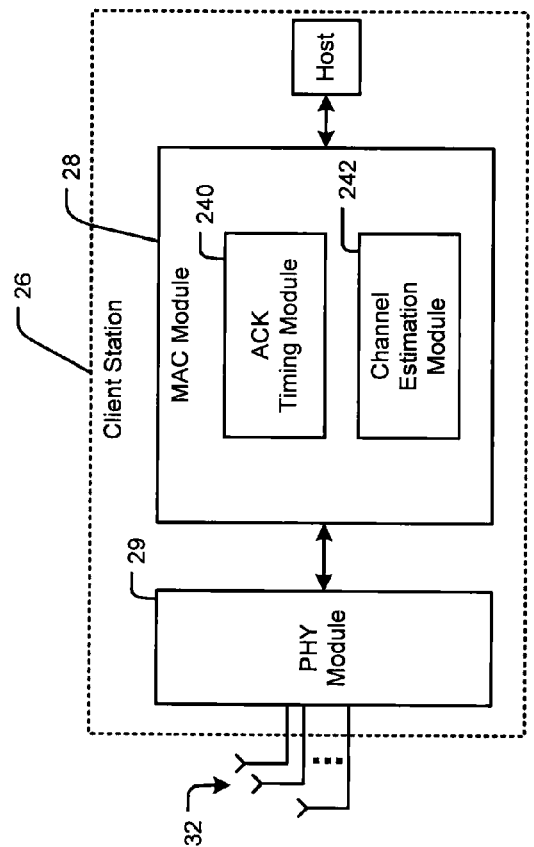
FIG. 5A illustrates an exemplary SDT client station.

Referring now to FIGS. 5A and 5B, an exemplary client station 26 is shown. The client station 26 is SDT enabled and includes the MAC module 28 and the PHY module 29. The MAC module 28 further includes an ACK timing module 240 and a channel estimation module 242. The ACK timing module 240 receives an acknowledgment timing slot from the AP 14 as described above. The ACK timing module 240 determines when to transmit an ACK after receiving the SDT data.

In FIG. 5B, a method performed by the client station 26 of FIG. 5A is shown. The method 260 begins with step 262. In step 264, the client station 26 determines whether the SDT data 60 was received. If not, normal operation is performed in step 266 and the method returns to step 264. When step 264 is true, an ACK timer is started in step 270. The SDT data 60 is received in step 272. The method determines whether the ACK timer is up (i.e., whether the timer has reached an end-point) in step 274. If not, control returns to step 274. When step 274 is true, control continues with step 276 and sends an ACK to the AP 14.

Figure 6B:
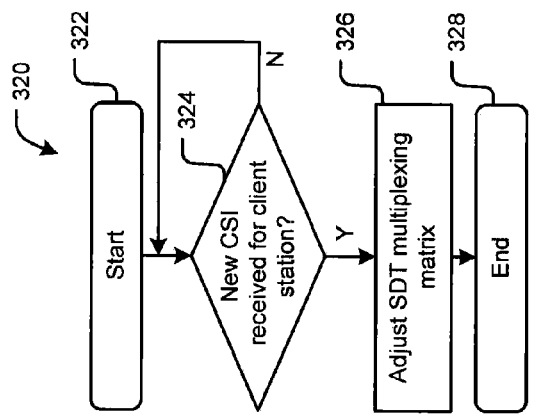
FIG. 6B illustrates a method performed by the AP of FIG. 6A.
Figure 6A:
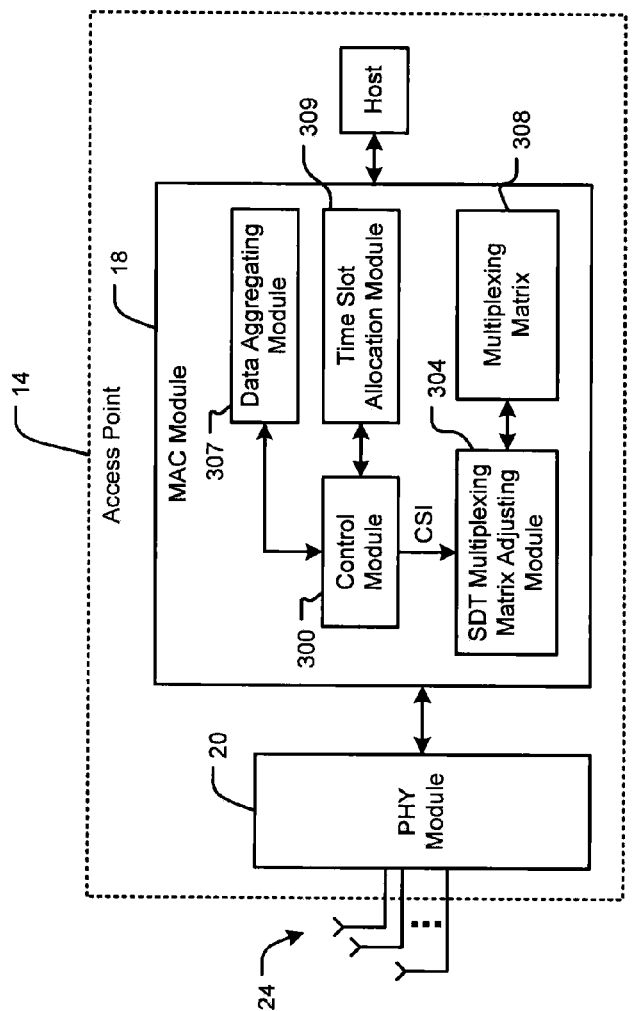
FIG. 6A illustrates an exemplary AP.

Referring now to FIGS. 6A and 6B, an exemplary AP 14 is shown. The AP 14 includes the MAC module 18 and the PHY module 20 as described. The MAC module 18 includes a control module 300 that receives CSI from the client stations 26 that are SDT enabled. The client stations 26 may generate the CSI in a conventional manner. The CSI may include channel information for each of the tones. The control module 300 outputs the CSI to an SDT multiplexing matrix adjusting module 304, which adjusts an SDT multiplexing matrix 308 for the tones.

The AP 14 may further include a data aggregation module 307 that selectively aggregates the SDT data into packets, frames and/or subframes. SDT data transmitted by the AP 14 may be divided into subframes by the data aggregation module 307. Conventionally, each subframe is addressed to a single client station or a group of client stations. With SDT, each sub-frame may carry independent information to client stations and/or groups of client stations.

The AP 14 may further include a time slot allocation module 309 that assigns time slots for ACKs from the client stations 26. In some implementations, the time slot allocation module 309 inserts time allocation data into the SDT data for each client station 26.

In FIG. 6B, a method 320 performed by the AP 14 of FIG. 6A is shown. The method begins with step 322 and proceeds with step 324 where the AP 14 determines whether new CSI has been received from one of the client stations. If step 324 is false, control returns to step 324. If step 324 is true, the SDT matrix adjusting module 304 adjusts the SDT multiplexing matrix 308 in step 326. Control ends with step 328.

In FIGS. 7A and 7B, an exemplary AP 14 according to the present disclosure is shown. The AP 14 includes the MAC module 18 and the PHY module 20. The MAC module 18 includes channel estimating module 340. The channel estimating module 340 estimates CSI for the client stations 26. The channel estimating module 340 outputs the CSI to the SDT multiplexing matrix adjusting module 304, which adjusts the SDT multiplexing matrix 308 for the particular client station 26.

In FIG. 7B, a method 360 performed by the AP 14 of FIG. 7A is shown. The method begins with step 362 and proceeds with step 364 where the AP 14 determines whether new CSI has been estimated for a client station 26. If step 364 is false, control returns to step 364. In step 364 is true, the SDT multiplexing matrix adjusting module 304 adjusts the SDT multiplexing matrix 308 in step 366. Control ends with step 368.

The network interfaces may otherwise be complaint with IEEE standards—e.g., IEEE standards 802.11, 802.11a, 802.11b, 802.11g, 802.11h, 802.11n, 802.16, and/or 802.20, and/or Bluetooth, which are incorporated herein by reference in their entirety.

The present disclosure increases throughput by simultaneously transmitting independent data streams to multiple client stations. The present disclosure includes the use of multiple antennas at an AP to achieve SDT. The AP may consider a variety of criteria (interference avoidance, SINR balancing or other approach) to improve multi-user throughput. The AP may combine power allocation and SDT for maximal gains in throughput. The present disclosure also may combine SDT with multicast and data aggregation. A reserved time period during which legacy devices are forbidden from transmitting may be used during which SDT is conducted in the network. The reserved time interval may be divided into a time period for downlink of the SDT data and a time period for uplink ACKs from receiving client stations.

Figure 8B:
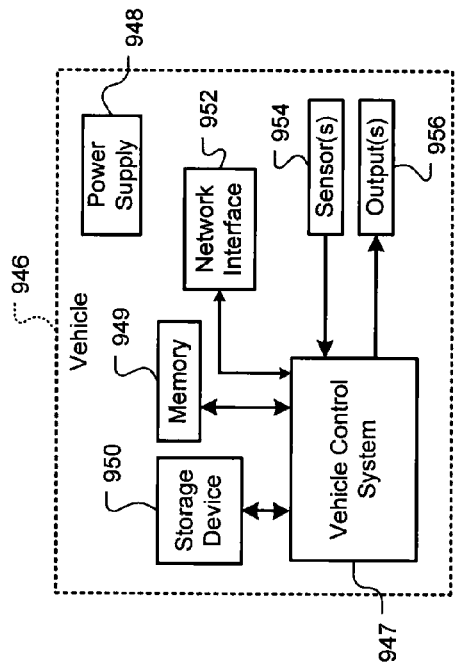
FIG. 8B is a functional block diagram of a vehicle control system.
Figure 8A:
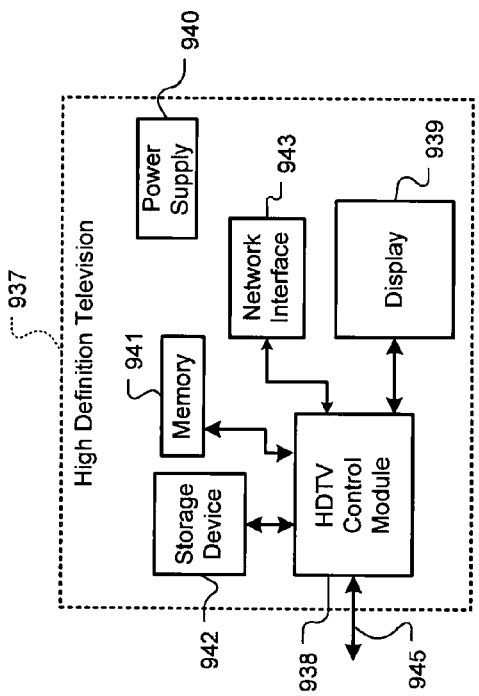
FIG. 8A is a functional block diagram of a high definition television.

Referring now to FIGS. 8A-8E, various exemplary implementations incorporating the teachings of the present disclosure are shown. Referring now to FIG. 8A, the teachings of the disclosure can be implemented in a wireless network interface of a high definition television (HDTV) 937. The HDTV 937 includes an HDTV control module 938, a display 939, a power supply 940, memory 941, a storage device 942, a network interface 943, and an external interface 945. If the network interface 943 includes a wireless local area network interface, an antenna (not shown) may be included.

The HDTV 937 can receive input signals from the network interface 943 and/or the external interface 945, which can send and receive data via cable, broadband Internet, and/or satellite. The HDTV control module 938 may process the input signals, including encoding, decoding, filtering, and/or formatting, and generate output signals. The output signals may be communicated to one or more of the display 939, memory 941, the storage device 942, the network interface 943, and the external interface 945.

Memory 941 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 942 may include an optical storage drive, such as a DVD drive, and/or a hard disk drive (HDD). The HDTV control module 938 communicates externally via the network interface 943 and/or the external interface 945. The power supply 940 provides power to the components of the HDTV 937.

Referring now to FIG. 8B, the teachings of the disclosure may be implemented in a wireless network interface of a vehicle 946. The vehicle 946 may include a vehicle control system 947, a power supply 948, memory 949, a storage device 950, and a network interface 952. If the network interface 952 includes a wireless local area network interface, an antenna (not shown) may be included. The vehicle control system 947 may be a powertrain control system, a body control system, an entertainment control system, an anti-lock braking system (ABS), a navigation system, a telematics system, a lane departure system, an adaptive cruise control system, etc.

The vehicle control system 947 may communicate with one or more sensors 954 and generate one or more output signals 956. The sensors 954 may include temperature sensors, acceleration sensors, pressure sensors, rotational sensors, airflow sensors, etc. The output signals 956 may control engine operating parameters, transmission operating parameters, suspension parameters, brake parameters, etc.

The power supply 948 provides power to the components of the vehicle 946. The vehicle control system 947 may store data in memory 949 and/or the storage device 950. Memory 949 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 950 may include an optical storage drive, such as a DVD drive, and/or a hard disk drive (HDD). The vehicle control system 947 may communicate externally using the network interface 952.

Figure 8D:
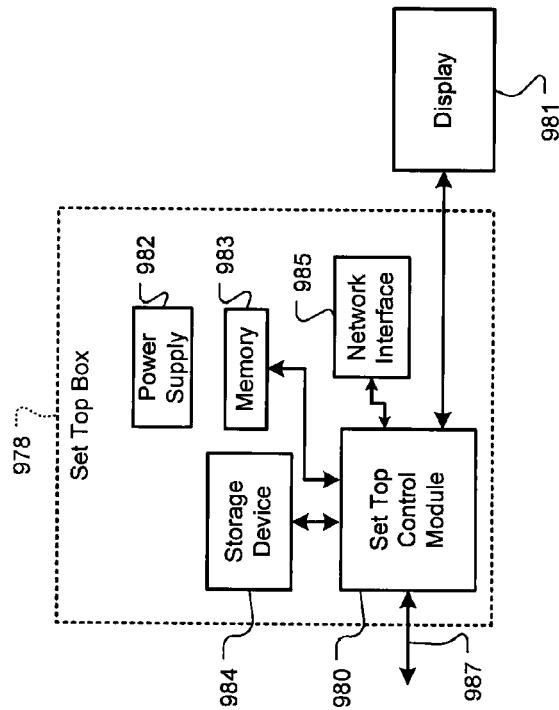
FIG. 8D is a functional block diagram of a set top box.
Figure 8C:
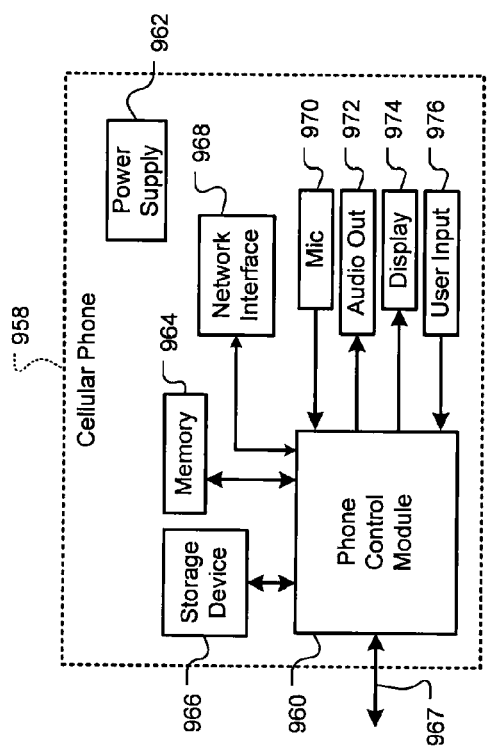
FIG. 8C is a functional block diagram of a cellular phone.

Referring now to FIG. 8C, the teachings of the disclosure can be implemented in a wireless network interface of a cellular phone 958. The cellular phone 958 includes a phone control module 960, a power supply 962, memory 964, a storage device 966, and a cellular network interface 967. The cellular phone 958 may include a network interface 968, a microphone 970, an audio output 972 such as a speaker and/or output jack, a display 974, and a user input device 976 such as a keypad and/or pointing device. If the network interface 968 includes a wireless local area network interface, an antenna (not shown) may be included.

The phone control module 960 may receive input signals from the cellular network interface 967, the network interface 968, the microphone 970, and/or the user input device 976. The phone control module 960 may process signals, including encoding, decoding, filtering, and/or formatting, and generate output signals. The output signals may be communicated to one or more of memory 964, the storage device 966, the cellular network interface 967, the network interface 968, and the audio output 972.

Memory 964 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 966 may include an optical storage drive, such as a DVD drive, and/or a hard disk drive (HDD). The power supply 962 provides power to the components of the cellular phone 958.

Referring now to FIG. 8D, the teachings of the disclosure can be implemented in a wireless network interface of a set top box 978. The set top box 978 includes a set top control module 980, a display 981, a power supply 982, memory 983, a storage device 984, and a network interface 985. If the network interface 985 includes a wireless local area network interface, an antenna (not shown) may be included.

The set top control module 980 may receive input signals from the network interface 985 and an external interface 987, which can send and receive data via cable, broadband Internet, and/or satellite. The set top control module 980 may process signals, including encoding, decoding, filtering, and/or formatting, and generate output signals. The output signals may include audio and/or video signals in standard and/or high definition formats. The output signals may be communicated to the network interface 985 and/or to the display 981. The display 981 may include a television, a projector, and/or a monitor.

The power supply 982 provides power to the components of the set top box 978. Memory 983 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 984 may include an optical storage drive, such as a DVD drive, and/or a hard disk drive (HDD).

Figure 8E:
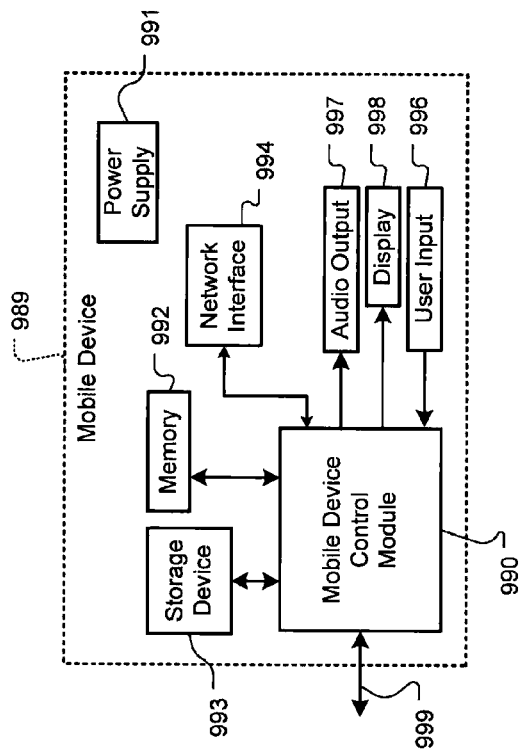
FIG. 8E is a functional block diagram of a mobile device.

Referring now to FIG. 8E, the teachings of the disclosure can be implemented in a wireless network interface of a mobile device 989. The mobile device 989 may include a mobile device control module 990, a power supply 991, memory 992, a storage device 993, a network interface 994, and an external interface 999. If the network interface 994 includes a wireless local area network interface, an antenna (not shown) may be included.

The mobile device control module 990 may receive input signals from the network interface 994 and/or the external interface 999. The external interface 999 may include USB, infrared, and/or Ethernet. The input signals may include compressed audio and/or video, and may be compliant with the MP3 format. Additionally, the mobile device control module 990 may receive input from a user input 996 such as a keypad, touchpad, or individual buttons. The mobile device control module 990 may process input signals, including encoding, decoding, filtering, and/or formatting, and generate output signals.

The mobile device control module 990 may output audio signals to an audio output 997 and video signals to a display 998. The audio output 997 may include a speaker and/or an output jack. The display 998 may present a graphical user interface, which may include menus, icons, etc. The power supply 991 provides power to the components of the mobile device 989. Memory 992 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 993 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. An access point comprising:
  a first transmitter configured to (i) during a first window, transmit a first data stream to a first client station, and (ii) during a second window, transmit a second data stream to a second client station;
  a second transmitter configured to
    during the first window and while the first transmitter transmits the first data stream to the first client station, transmit a third data stream to a third client station,
    during a first portion of the second window and while the first transmitter is transmitting the second data stream to the second client station, refrain from transmitting a fourth data stream to a fourth client station, and
    subsequent to the first transmitter completing the transmission of the second data stream to the second client station and during a second portion of the second window, transmit the fourth data stream to the fourth client station; and
  a control module configured to determine whether the first client station and the third client station are enabled for simultaneous downlink transmission,
  wherein
    the first transmitter is configured to, based on whether the first client station is enabled for simultaneous downlink transmission during the first window, transmit the first data stream to the first client station, and
    the second transmitter is configured to, based on whether the third client station is enabled for simultaneous downlink transmission during the first window, transmit the third data stream to the third client station.

2. The access point of claim 1, wherein:
  the first client station is separate from the third client station; and
  the second client station is separate from the fourth client station.

3. An access point comprising:
  a first transmitter configured to (i) during a first window, transmit a first data stream to a first client station, and (ii) during a second window, transmit a second data stream to a second client station; and
  a second transmitter configured to
    during the first window and while the first transmitter transmits the first data stream to the first client station, transmit a third data stream to a third client station,
    during a first portion of the second window and while the first transmitter is transmitting the second data stream to the second client station, refrain from transmitting a fourth data stream to a fourth client station, and
    subsequent to the first transmitter completing the transmission of the second data stream to the second client station and during a second portion of the second window, transmit the fourth data stream to the fourth client station, wherein
the first client station and the third client station are enabled for simultaneous downlink transmission during the first window, and
the second client station and the fourth client station are not enabled for simultaneous downlink transmission during the second window.

4. An access point comprising:
a first transmitter configured to (i) during a first window, transmit a first data stream to a first client station, and (ii) during a second window, transmit a second data stream to a second client station; and
a second transmitter configured to
during the first window and while the first transmitter transmits the first data stream to the first client station, transmit a third data stream to a third client station,
during a first portion of the second window and while the first transmitter is transmitting the second data stream to the second client station, refrain from transmitting a fourth data stream to a fourth client station, and
subsequent to the first transmitter completing the transmission of the second data stream to the second client station and during a second portion of the second window, transmit the fourth data stream to the fourth client station,
wherein the second transmitter is configured to
during the first window and while the first transmitter transmits the first data stream to the first client station, transmit the third data stream to the first client station,
during the first portion of the second window and while the first transmitter is transmitting the second data stream to the second client station, refrain from transmitting the fourth data stream to the second client station, and
subsequent to the first transmitter completing transmission of the second data stream to the second client station and during the second portion of the second window, transmit the fourth data stream to the second client station.

5. An access point comprising:
a first transmitter configured to (i) during a first window, transmit a first data stream to a first client station, and (ii) during a second window, transmit a second data stream to a second client station;
a second transmitter configured to
during the first window and while the first transmitter transmits the first data stream to the first client station, transmit a third data stream to a third client station,
during a first portion of the second window and while the first transmitter is transmitting the second data stream to the second client station, refrain from transmitting a fourth data stream to a fourth client station, and
subsequent to the first transmitter completing the transmission of the second data stream to the second client station and during a second portion of the second window, transmit the fourth data stream to the fourth client station;
a first matrix module configured to (i) receive a first plurality of modulated data streams, (ii) generate a first matrix based on channel conditions between the access point and one of the first client station and the second client station, and (ii) apply the first matrix to the first plurality of modulated data streams to generate a first multiplexed data stream and a second multiplexed data stream;
a first summing module configured to, based on the first multiplexed data stream, generate the first data stream and the second data stream; and
a second summing module configured to, based on the second multiplexed data stream, generate the third data stream and the fourth data stream.

6. The access point of claim 5, further comprising:
a second matrix module configured to (i) receive a second plurality of modulated data streams, (ii) generate a second matrix based on channel conditions between the access point and one of the third client station and the fourth client station, and (ii) apply the second matrix to the second plurality of modulated data streams to generate a third multiplexed data stream and a fourth multiplexed data stream;
the first summing module is configured to sum the first multiplexed data stream and the third multiplexed data stream to generate each of the first data stream and the second data stream; and
the second summing module is configured to sum the second multiplexed data stream and the fourth multiplexed data stream to generate each of the third data stream and the fourth data stream.

7. The access point of claim 5, wherein the first matrix module is configured to generate the first matrix for the first client station by minimizing signal energy of a signal sent to the third client station.

8. The access point of claim 5, wherein the first matrix module is configured to generate the first matrix for the first client station by maximizing a signal-to-interference and noise ratio for the first client station and the third client station.

9. The access point of claim 5, wherein the first matrix module is configured to, for tones of the first transmit data stream and the third transmit data stream, adjust at least one of amplitude or phase.

10. The access point of claim 5, wherein one of the first transmitter and the second transmitter is configured to transmit a signal vector s, where:

$$s = \sum_{i=1}^{N} W_i x_i;$$

$x_i$ is an information vector for an $i^{th}$ one of a plurality of client stations, the plurality of client stations comprise the first client station and the third client station; and
$W_i$ is a matrix for the $i^{th}$ one of the plurality of client stations.

11. A method comprising:
during a first window, transmitting, via a first transmitter, a first data stream from an access point to a first client station;
during a second window, transmitting, via the first transmitter, a second data stream from the access point to a second client station;
during the first window and while the first transmitter transmits the first data stream to the first client station, transmitting, via a second transmitter, a third data stream from the access point to a third client station;
during a first portion of the second window and while the first transmitter is transmitting the second data stream to the second client station, refraining from transmitting a fourth data stream from the second transmitter to a fourth client station;

subsequent to the first transmitter completing the transmission of the second data stream to the second client station and during a second portion of the second window, transmitting, via the second transmitter, the fourth data stream from the access point to the fourth client station; and determining whether the first client station and the third client station are enabled for simultaneous downlink transmission, wherein
 based on whether the first client station is enabled for simultaneous downlink transmission during the first window, the first data stream is transmitted, via the first transmitter, to the first client station, and
 based on whether the third client station is enabled for simultaneous downlink transmission during the first window, the third data stream is transmitted, via the second transmitter, to the third client station.

12. The method of claim 11, wherein:
the first client station and the third client station are enabled for simultaneous downlink transmission during the first window; and
the second client station and the fourth client station are not enabled for simultaneous downlink transmission during the second window.

13. The method of claim 11, wherein:
the first client station is separate from the third client station; and
the second client station is separate from the fourth client station.

14. The method of claim 11, wherein:
during the first window and while the first transmitter transmits the first data stream to the first client station, the third data stream is transmitted, via the second transmitter, to the first client station;
during the first portion of the second window and while the first transmitter is transmitting the second data stream to the second client station, the fourth data stream is not transmitted, via the second transmitter, to the second client station; and subsequent to the first transmitter completing transmission of the second data stream to the second client station and during the second portion of the second window, the fourth data stream is transmitted, via the second transmitter, to the second client station.

15. The method of claim 11, further comprising:
receiving a first plurality of modulated data streams;
generating a first matrix based on channel conditions between the access point and one of the first client station and the second client station;
applying the first matrix to the first plurality of modulated data streams to generate a first multiplexed data stream and a second multiplexed data stream;
based on the first multiplexed data stream, generating the first data stream and the second data stream; and
based on the second multiplexed data stream, generating the third data stream and the fourth data stream.

16. The method of claim 15, further comprising:
receiving a second plurality of modulated data streams;
generating a second matrix based on channel conditions between the access point and one of the third client station and the fourth client station;
applying the second matrix to the second plurality of modulated data streams to generate a third multiplexed data stream and a fourth multiplexed data stream;
summing the first multiplexed data stream and the third multiplexed data stream to generate each of the first data stream and the second data stream; and
summing the second multiplexed data stream and the fourth multiplexed data stream to generate each of the third data stream and the fourth data stream.

17. The method of claim 15, wherein the first matrix is generated for the first client station by minimizing signal energy of a signal sent to the third client station.

18. The method of claim 15, wherein the first matrix is generated for the first client station by maximizing a signal-to-interference and noise ratio for the first client station and the third client station.

* * * * *